United States Patent
El Ayach et al.

(10) Patent No.: US 9,474,013 B2
(45) Date of Patent: Oct. 18, 2016

(54) METHOD AND APPARATUS FOR CONNECTION POINT DISCOVERY AND ASSOCIATION IN A DIRECTIONAL WIRELESS NETWORK

(71) Applicant: QUALCOMM Incorporated, San Diego, CA (US)

(72) Inventors: Omar El Ayach, San Diego, CA (US); Sundar Subramanian, Bridgewater, NJ (US); John Edward Smee, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/306,097

(22) Filed: Jun. 16, 2014

(65) Prior Publication Data

US 2015/0365814 A1 Dec. 17, 2015

(51) Int. Cl.
*H04L 12/28* (2006.01)
*H04W 48/16* (2009.01)
*H04W 16/28* (2009.01)
*H04W 48/20* (2009.01)

(52) U.S. Cl.
CPC ............. *H04W 48/16* (2013.01); *H04W 16/28* (2013.01); *H04W 48/20* (2013.01)

(58) Field of Classification Search
None
See application file for complete search history.

(56) References Cited

U.S. PATENT DOCUMENTS

| 8,321,166 | B2 | 11/2012 | O'Hare |
| 8,379,560 | B2 | 2/2013 | Kesselman et al. |
| 8,437,752 | B2 | 5/2013 | Flore et al. |
| 8,649,791 | B1 | 2/2014 | Wohld |
| 2005/0202859 | A1* | 9/2005 | Johnson ............... H04B 7/0408 455/575.7 |
| 2007/0224987 | A1* | 9/2007 | Ishii ...................... H04W 16/28 455/436 |
| 2007/0291770 | A1 | 12/2007 | Kitazoe |

(Continued)

FOREIGN PATENT DOCUMENTS

WO 2014009250 A1 1/2014

OTHER PUBLICATIONS

Kim M., et al., "Analysis of directional neighbour discovery process in millimetre wave wireless personal area networks," The Institution of Engineering and Technology, 2013, vol. 2 (2), pp. 92-101.

(Continued)

*Primary Examiner* — Otis L Thompson, Jr.
(74) *Attorney, Agent, or Firm* — Arent Fox LLP

(57) ABSTRACT

A method, an apparatus, and a computer program product for wireless communication are provided. The apparatus listens for directional signal beams according to a first pattern, detects a plurality of discovery signals respectively from a plurality of connection points (CPs), wherein each CP transmits a discovery signal by transmitting a directional beam according to a respective pattern, determines information related to each CP based on the discovery signal detected from a respective CP, determines a timeslot for transmitting an association signal to each CP, wherein a respective timeslot is determined based on the information determined for the respective CP or a timeslot in which the respective discovery signal is transmitted by the respective CP according to the respective pattern, and transmits an association signal to each CP in the respective timeslot according to a determined beamforming direction of the UE and a determined beamforming direction of the respective CP.

26 Claims, 12 Drawing Sheets

(56) References Cited

U.S. PATENT DOCUMENTS

| | | | |
|---|---|---|---|
| 2009/0238156 A1* | 9/2009 | Yong | H04B 7/0491 370/336 |
| 2009/0247171 A1* | 10/2009 | Suga | H04W 72/046 455/447 |
| 2010/0014463 A1* | 1/2010 | Nagai | H04B 7/0695 370/328 |
| 2010/0202434 A1* | 8/2010 | Wu | H01Q 21/205 370/345 |
| 2010/0214169 A1 | 8/2010 | Kafle | |
| 2011/0110340 A1 | 5/2011 | Lakkis | |
| 2011/0170573 A1* | 7/2011 | Kim | H04W 48/08 375/130 |
| 2011/0205969 A1* | 8/2011 | Ahmad | H04W 16/28 370/328 |
| 2011/0274056 A1* | 11/2011 | Sampath | H04B 7/0695 370/329 |
| 2012/0028588 A1 | 2/2012 | Morioka et al. | |
| 2012/0064841 A1 | 3/2012 | Husted et al. | |
| 2013/0237218 A1* | 9/2013 | Li | H04W 48/16 455/434 |
| 2013/0242773 A1* | 9/2013 | Wernersson | H04B 7/024 370/252 |
| 2015/0131616 A1* | 5/2015 | Jo | H04W 16/28 370/331 |
| 2015/0201368 A1* | 7/2015 | Cudak | H04W 48/12 370/329 |

OTHER PUBLICATIONS

International Search Report and Written Opinion—PCT/US2015/034527—ISA/EPO—Aug. 27, 2015.

Second Written Opinion from International Application No. PCT/US2015/034527, dated May 2, 2016, 6 pp.

* cited by examiner

METHOD AND APPARATUS FOR CONNECTION POINT DISCOVERY AND ASSOCIATION IN A DIRECTIONAL WIRELESS NETWORK

BACKGROUND

1. Field

The present disclosure relates generally to communication systems, and more particularly, to a signaling procedure facilitating a user equipment (UE) to discover and associate with multiple connection points (CPs) in a millimeter wave (mmW) communication system using beamforming

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Millimeter wave (mmW) systems functioning at higher carrier frequencies may occupy a bandwidth much larger than what is possible in most commercial microwave systems, e.g., cellular systems. However, a mmW system operating at the higher carrier frequencies must deal with the existence of increased pathloss before data communication can occur. The increased pathloss may be overcome by leveraging multiple antennas or antenna arrays to send a beamformed signal and yield a beamforming array gain. However, beamforming may limit a coverage area of a phased antenna array, thus making the communication of discovery signals with neighboring connection points (CPs) more difficult compared with communicating signals in an omni-directional manner. Accordingly, what is needed is a signaling protocol that overcomes the phased antenna array coverage area limitations caused by beamforming.

SUMMARY

In an aspect of the disclosure, a method, a computer program product, and an apparatus are provided. The apparatus for wireless communication performs discovery signal detection by listening for at least one directional beam according to a first pattern, detects a plurality of discovery signals respectively from a plurality of connection points (CPs), wherein each CP transmits a discovery signal by transmitting a directional beam according to a respective pattern, determines information related to each CP based on the discovery signal detected from a respective CP, determines a beamforming direction of the UE based on a direction of the first pattern at which a discovery signal having a high signal quality is received, determines a beamforming direction of each CP based on a direction of the respective pattern at which a respective discovery signal is transmitted, determines a timeslot for transmitting an association signal to each CP, wherein a respective timeslot is determined based on the information determined for the respective CP or a timeslot in which the respective discovery signal is transmitted by the respective CP according to the respective pattern, and transmits an association signal to each CP in the respective timeslot according to the beamforming direction of the UE and the beamforming direction of the respective CP.

In another aspect, the apparatus transmits a discovery signal to a user equipment (UE) by transmitting a directional beam according to a first pattern and receives an association signal from the UE in a timeslot, wherein the association signal is received according to a beamforming direction of the UE and a beamforming direction of the CP. The beamforming direction of the UE is based on a direction of a second pattern at which the discovery signal is received at the UE with a high signal quality. The beamforming direction of the CP is based on a direction of the first pattern at which the discovery signal is transmitted. Moreover, the timeslot for receiving the association signal is determined based on information included in or inferred from the discovery signal or a timeslot in which the discovery signal is transmitted by the CP according to the first pattern.

DETAILED DESCRIPTION

Figure 1:
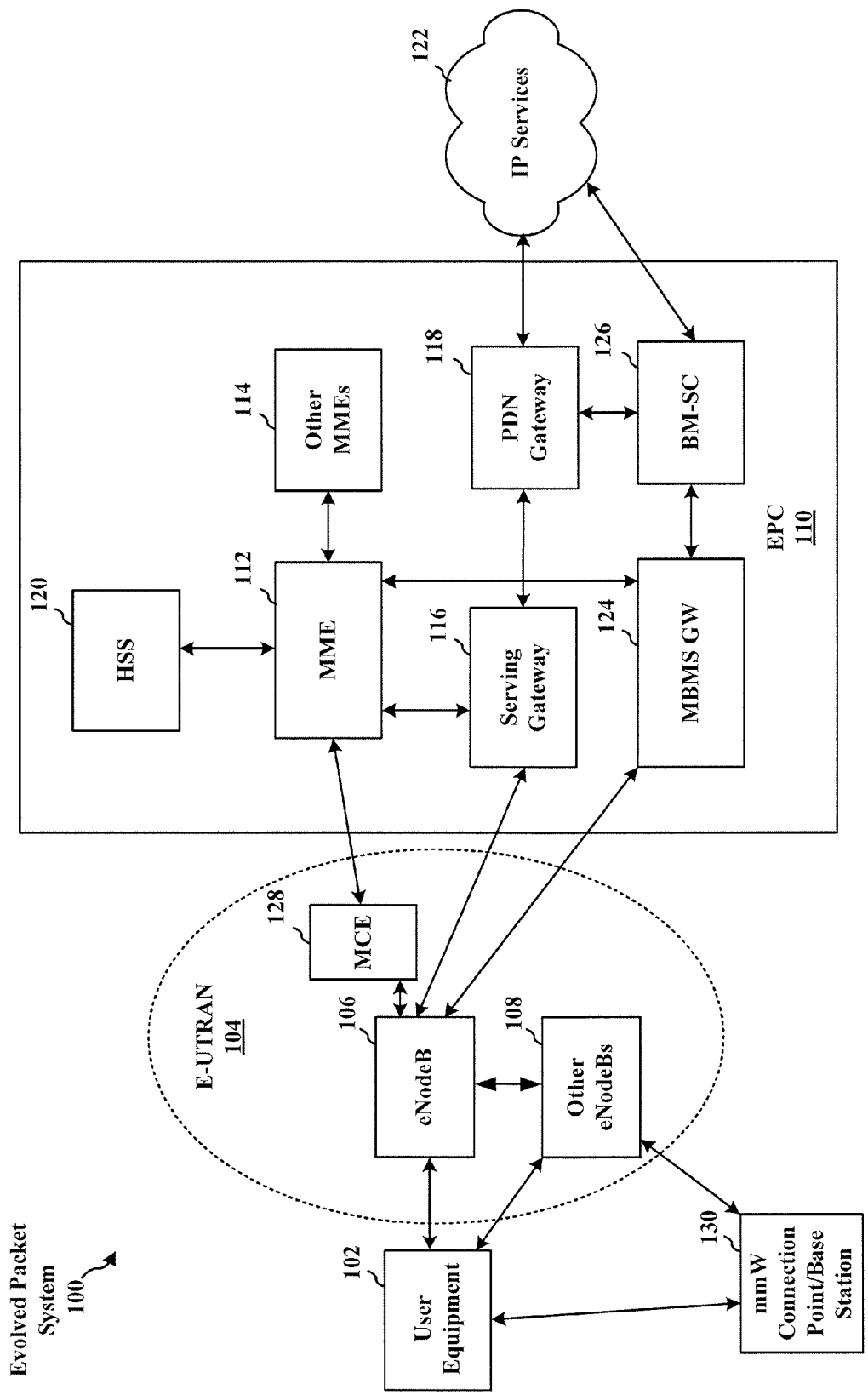
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a

Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link. Discovery techniques in a directional wireless network such as EPS 100 between a UE 102 and CP 130 are discussed in further detail infra.

Figure 2:
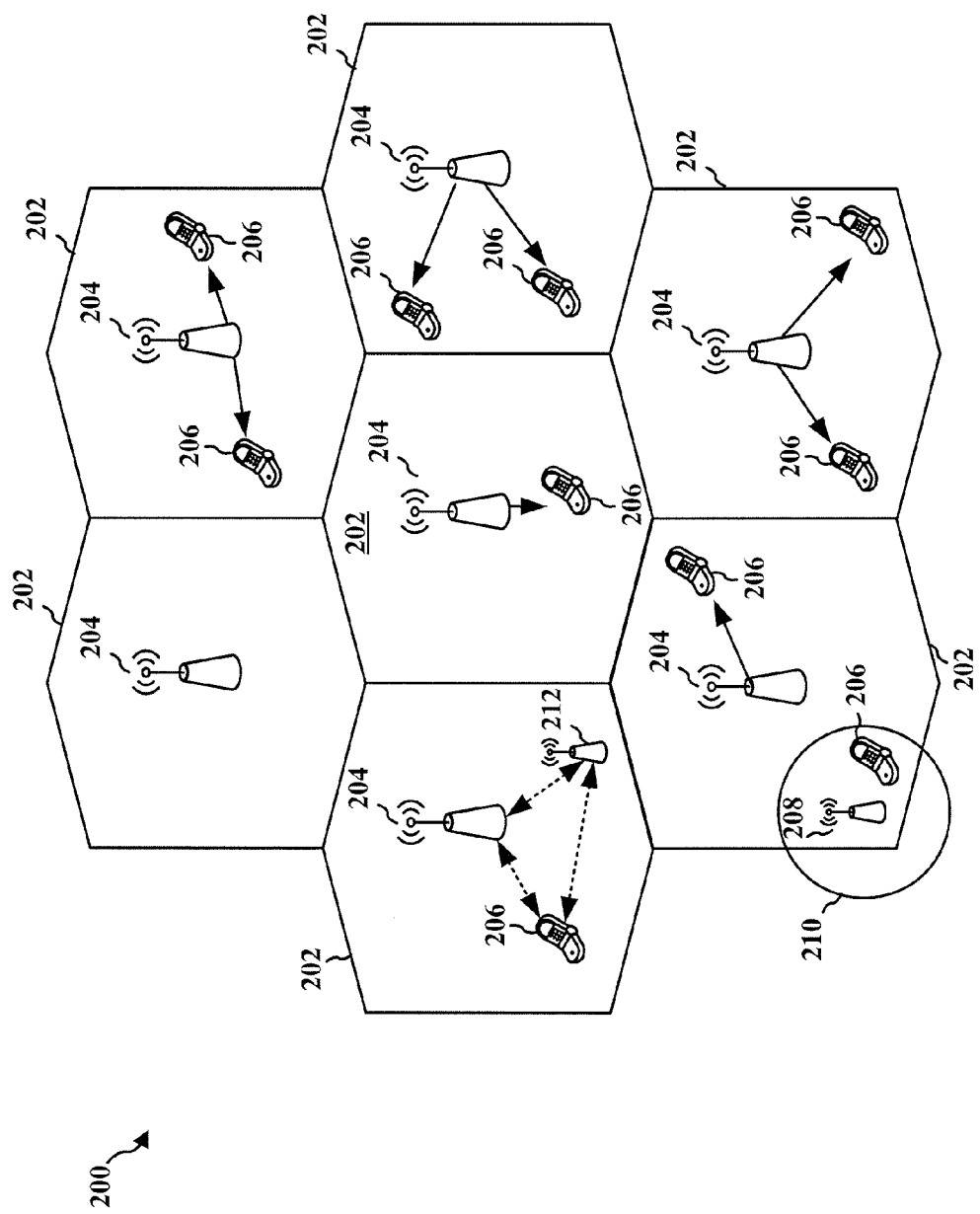
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
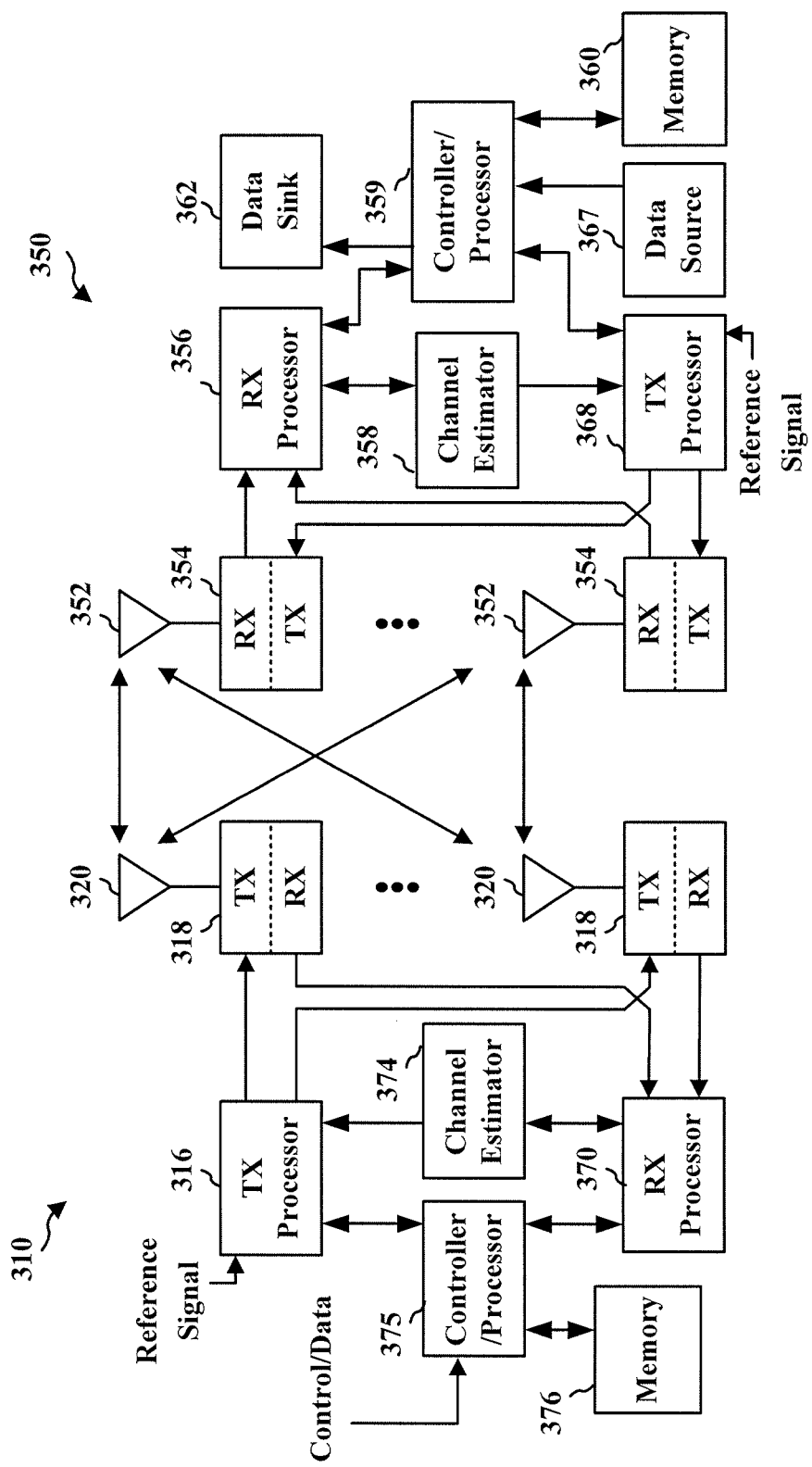
FIG. 3 is a diagram illustrating an example of an evolved Node B and user equipment in an access network.

FIG. 3 is a block diagram of a base station 310 in communication with a UE 350 in an access network. The base station 310 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 350 may be capable of communicating signals via the LTE system and/or the mmW system. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354 RX receives a signal through its respective antenna 352. Each receiver 354 RX recovers information modulated onto an RF carrier and provides the information to receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 can be associated with a memory 360 that stores program codes and data. The memory 360 may be referred to as a computer-readable medium. In the DL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the base station 310, the controller/processor 359 provides header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to an mmW base station, it should be understood that the disclosure also applies to near mmW base stations. The millimeter wavelength RF channel has extremely high path loss and a short range. In order to build a useful communication network in the millimeter wavelength spectrum, a beam forming technique may be used to compensate for the extreme high path loss. The beam forming technique focuses the RF energy into a narrow direction to allow the RF beam to propagate farther in that direction. Using the beam forming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. Thus, in order to ensure that the UE has continuous, seamless coverage, multiple beams in as many different directions as possible may be available.

In order to provide a continuous and seamless coverage, each of several mmW base stations in the vicinity of the UE may measure a channel between the UE and the base station, and find the best beam directions the base station can transmit to reach the UE. In addition, each of the base stations may coordinate with other mmW base stations to determine which mmW base station has the best beam direction. Further, each of the base stations may plan for a secondary beam in case of a sudden change that can cause severe attenuation of the best beam.

Beam forming techniques and methods for providing seamless and continuous coverage for a mobile UE in continuously changing wireless environments is provided infra.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling in support of discovery, synchronization, or association on a mmW channel can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 4A:
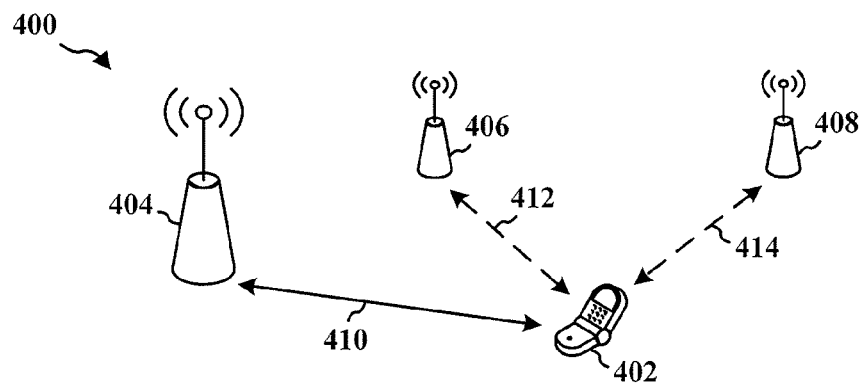
FIGS. 4A to 4C are diagrams illustrating example deployments of a mmW system used in conjunction with a LTE system.
Figure 4B:
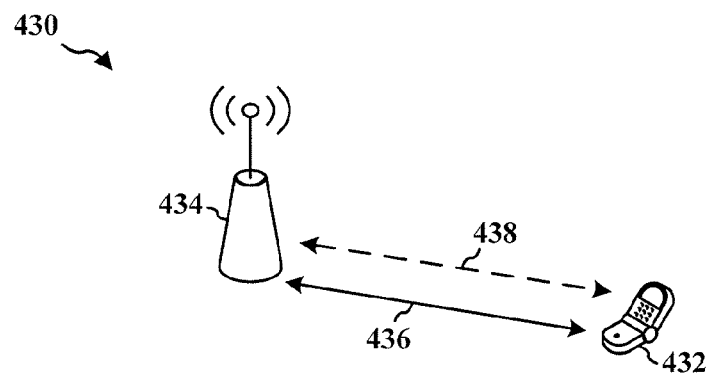
Figure 4C:
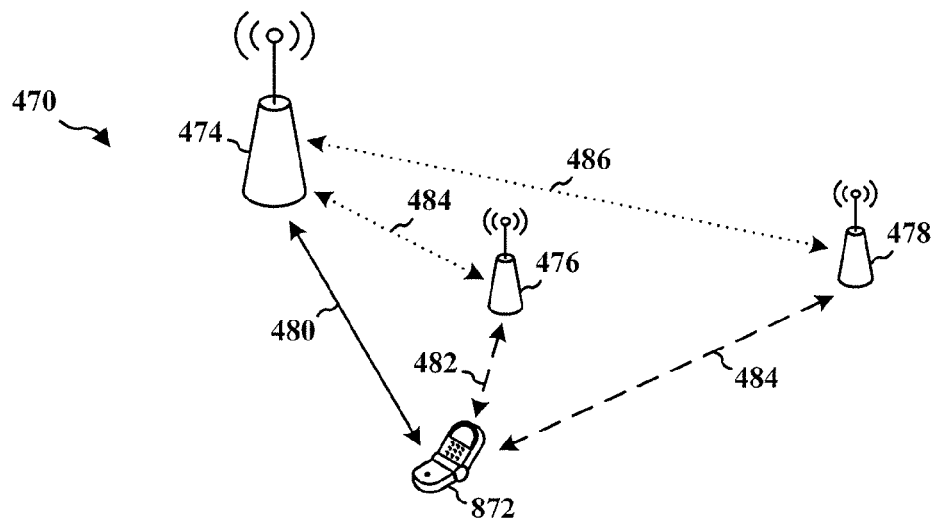

FIGS. 4A to 4C are diagrams illustrating example deployments of a mmW system used in conjunction with a LTE system. In FIG. 4A, diagram 400 illustrates a deployment where a LTE system operates independently of, and in parallel with, a mmW system. As shown in FIG. 4A, a UE 402 is capable of communicating signals via a LTE system and a mmW system. Accordingly, the UE 402 may communicate with a eNB 404 over a LTE link 410. In parallel with the LTE link 410, the UE 402 may also communicate with a first BS 406 over a first mmW link 412 and communicate with a second BS 408 over a second mmW link 414.

In FIG. 4B, diagram 430 illustrates a deployment where the LTE system and the mmW system are collocated. As shown in FIG. 4B, a UE 432 is capable of communicating signals via the LTE system and the mmW system. In an aspect, a BS 434 may be an LTE eNB capable of communicating signals via the LTE system and the mmW system. As such, the BS 434 may be referred to as a LTE+mmW eNB. In another aspect, the BS 434 may be a mmW CP capable of communicating signals via the LTE system and the mmW system. As such, the BS 434 may be referred to as a LTE+mmW BS. The UE 432 may communicate with the BS 434 over a LTE link 436. Meanwhile, the UE 432 may also communicate with the BS 434 over a mmW link 438.

In FIG. 4C, diagram 470 illustrates a deployment where a BS capable of communicating signals via the LTE system and the mmW system (LTE +mmW base station) is present with BSs capable of communicating signals via the mmW system only. As shown in FIG. 4C, a UE 472 may communicate with a LTE+mmW BS 474 over a LTE link 480. The LTE +mmW BS 474 may be a LTE+mmW eNB. In parallel with the LTE link 480, the UE 472 may also communicate with a second BS 476 over a first mmW link 482 and communicate with a third BS 478 over a second mmW link 484. The second BS 476 may further communicate with the LTE +mmW BS 474 over a first mmW backhaul link 484. The third BS 478 may further communicate with the LTE +mmW BS 474 over a second mmW backhaul link 486.

Figure 5A:
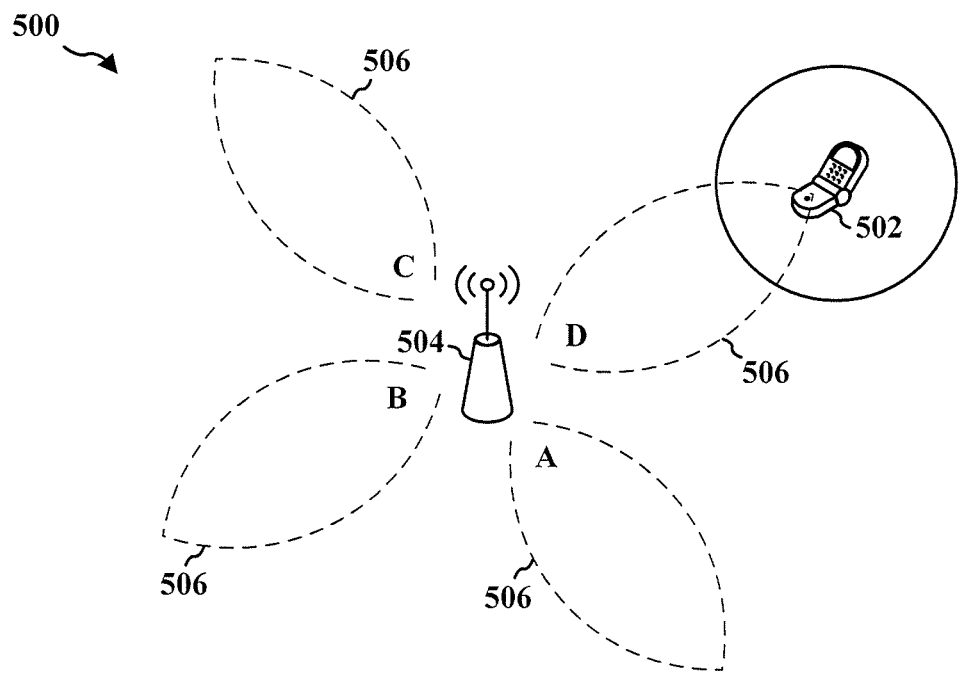
FIGS. 5A and 5B are diagrams illustrating an example of the transmission of beamformed signals between a connection point and a UE.
Figure 5B:
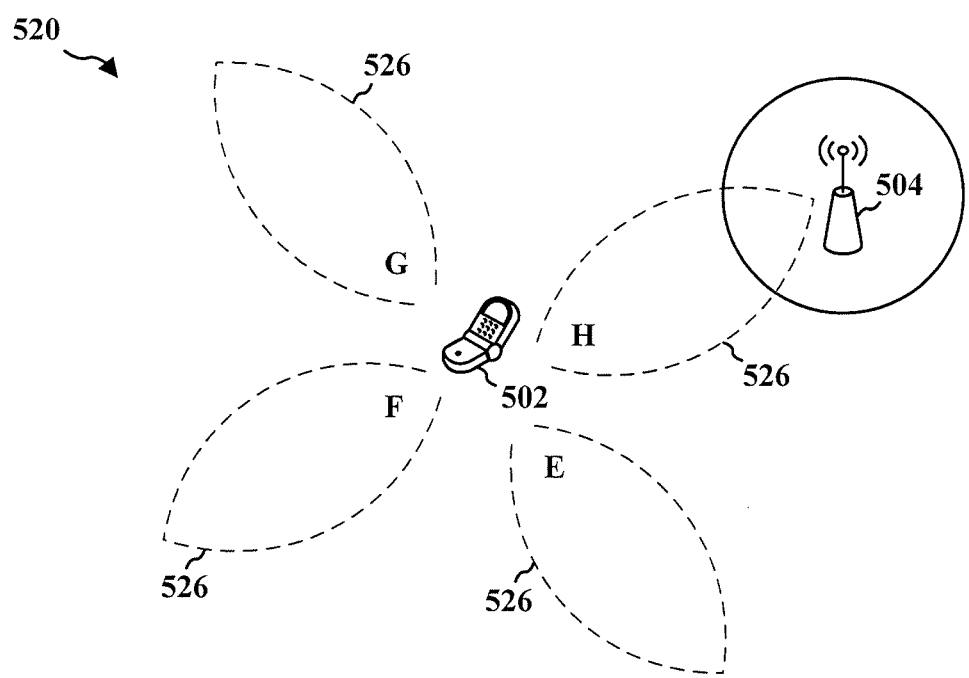

FIGS. 5A and 5B are diagrams illustrating an example of the transmission of beamformed signals between a CP and a UE. The CP may be embodied as a BS in a mmW system (mmW BS). Referring to FIG. 5A, diagram 500 illustrates a CP 504 of a mmW system transmitting beamformed signals 506 (e.g., synchronization signals or discovery signals) in different transmit directions (e.g., directions A, B, C, and D). In an example, the CP 504 may sweep through the transmit directions according to a sequence A-B-C-D. In another example, the CP 504 may sweep through the transmit directions according to the sequence B-D-A-C. Although only four transmit directions and two transmit sequences are described with respect to FIG. 5A, any number of different transmit directions and transmit sequences are contemplated.

After transmitting the signals, the CP 504 may switch to a receive mode. In the receive mode, the CP 504 may sweep through different receive directions in a sequence or pattern corresponding (mapping) to a sequence or pattern in which the CP 504 previously transmitted the synchronization/discovery signals in the different transmit directions. For example, if the CP 504 previously transmitted the synchronization/discovery signals in transmit directions according to the sequence A-B-C-D, then the CP 504 may sweep through receive directions according to the sequence A-B-C-D in an attempt to receive an association signal from a UE 502. In another example, if the CP 504 previously transmitted the synchronization/discovery signals in transmit directions according to the sequence B-D-A-C, then the CP 504 may sweep through receive directions according to the sequence B-D-A-C in an attempt to receive the association signal from the UE 502.

A propagation delay on each beamformed signal allows a UE 502 to perform a receive (RX) sweep. The UE 502 in a receive mode may sweep through different receive directions in an attempt to detect a synchronization/discovery signal 506 (see FIG. 5B). One or more of the synchronization/discovery signals 506 may be detected by the UE 502. When a strong synchronization/discovery signal 506 is detected, the UE 502 may determine an optimal transmit direction of the CP 504 and an optimal receive direction of the UE 502 corresponding to the strong synchronization/discovery signal. For example, the UE 502 may determine preliminary antenna weights/directions of the strong synchronization/discovery signal 506, and may further determine a time and/or resource where the CP 504 is expected to optimally receive a beamformed signal. Thereafter, the UE 502 may attempt to associate with the CP 504 via a beamformed signal.

Referring to FIG. 5B, the UE 502 may listen for beamformed discovery signals in different receive directions (e.g., directions E, F, G, and H). In an example, the UE 502 may sweep through the receive directions according to a sequence E-F-G-H. In another example, the UE 502 may sweep through the receive directions according to the sequence F-H-E-J. Although only four receive directions and two receive sequences are described with respect to FIG. 5B, any number of different receive directions and receive sequences are contemplated.

The UE 502 may attempt the association by transmitting beamformed signals 526 (e.g., association signals) in the different transmit directions (e.g., directions E, F, G, and H). In an aspect, the UE 502 may transmit an association signal 526 by transmitting along the optimal receive direction of the UE 502 at the time/resource where the CP 504 is expected to optimally receive the association signal. The CP 504 in the receive mode may sweep through different receive directions and detect the association signal 526 from the UE 502 during one or more timeslots corresponding to a receive direction. When a strong association signal 526 is detected, the CP 504 may determine an optimal transmit direction of the UE 502 and an optimal receive direction of the CP 504 corresponding to the strong association signal. For example, the CP 504 may determine preliminary antenna weights/directions of the strong association signal 526, and may further determine a time and/or resource where the UE 502 is expected to optimally receive a beamformed signal.

In an aspect, the CP 504 may choose a sequence or pattern for transmitting the synchronization/discovery signals according to a number of beamforming directions. The CP 504 may then transmit the signals for an amount of time long enough for the UE 502 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. Upon detecting a synchronization/discovery signal from the CP 504, the UE 502 may discover that the strongest synchronization/discovery signal is received when the UE 502 beamforming direction is k=2 and the CP 504 beamforming direction is n=3. Accordingly, the UE 502 may use the same antenna weights/directions for responding (transmitting a beamformed signal) to the CP 504 in a corresponding response timeslot. That is, the UE 502 may send a signal to the CP 504 using UE 502 beamforming direction k=2 during a timeslot when the CP 504 is expected to perform a receive sweep at CP 504 beamforming direction n=3.

In an aspect, the present disclosure provides for discovering CPs to which a UE may associate and ultimately exchange data in a directional wireless communication system (e.g., the mmW system utilizing beamforming) A mmW system operating at carrier frequencies significantly higher than most microwave wireless systems must deal with the existence of increased pathloss before data communication can occur. The increased pathloss may be overcome by leveraging multiple antennas or antenna arrays for sending a signal to yield a beamforming array gain. However, beamforming may limit an instantaneous coverage/visibility region of a phased antenna array, thus making neighbor CP discovery and broadcast (two fundamental processes that precede data exchange) more challenging compared to sending the signal in an omni-directional manner.

Therefore, what is needed is a signaling protocol that enables a UE to discover the existence of neighboring CPs, acquire timing of the neighboring CPs, and estimate a direction to neighboring CPs for the purpose of beamformed communication and data exchange. The signaling protocol should further enable the UE to inform a CP of its presence and associate with the CP.

In cellular systems, the UE may inform the CP of its presence by transmitting a random access channel (RACH) signal to the CP, and vice versa. However, a directional (beamformed) wireless system, such as the mmW system using beamforming, does not allow for an omni-directional RACH procedure. Further, because higher frequency signals suffer from an increased susceptibility to blockage, a discovery and RACH procedure must be significantly robust to deal with blocked paths and the UE falling back to other CPs discovered during an initial discovery period.

In an aspect, the present disclosure provides a signaling procedure for a UE to discover and associate with multiple CPs in a directional (beamformed) wireless communication network (e.g., mmW system). The multiple associated CPs form an active set of transmitters to which the UE can switch to if connection to a current serving CP is lost.

Figure 6:
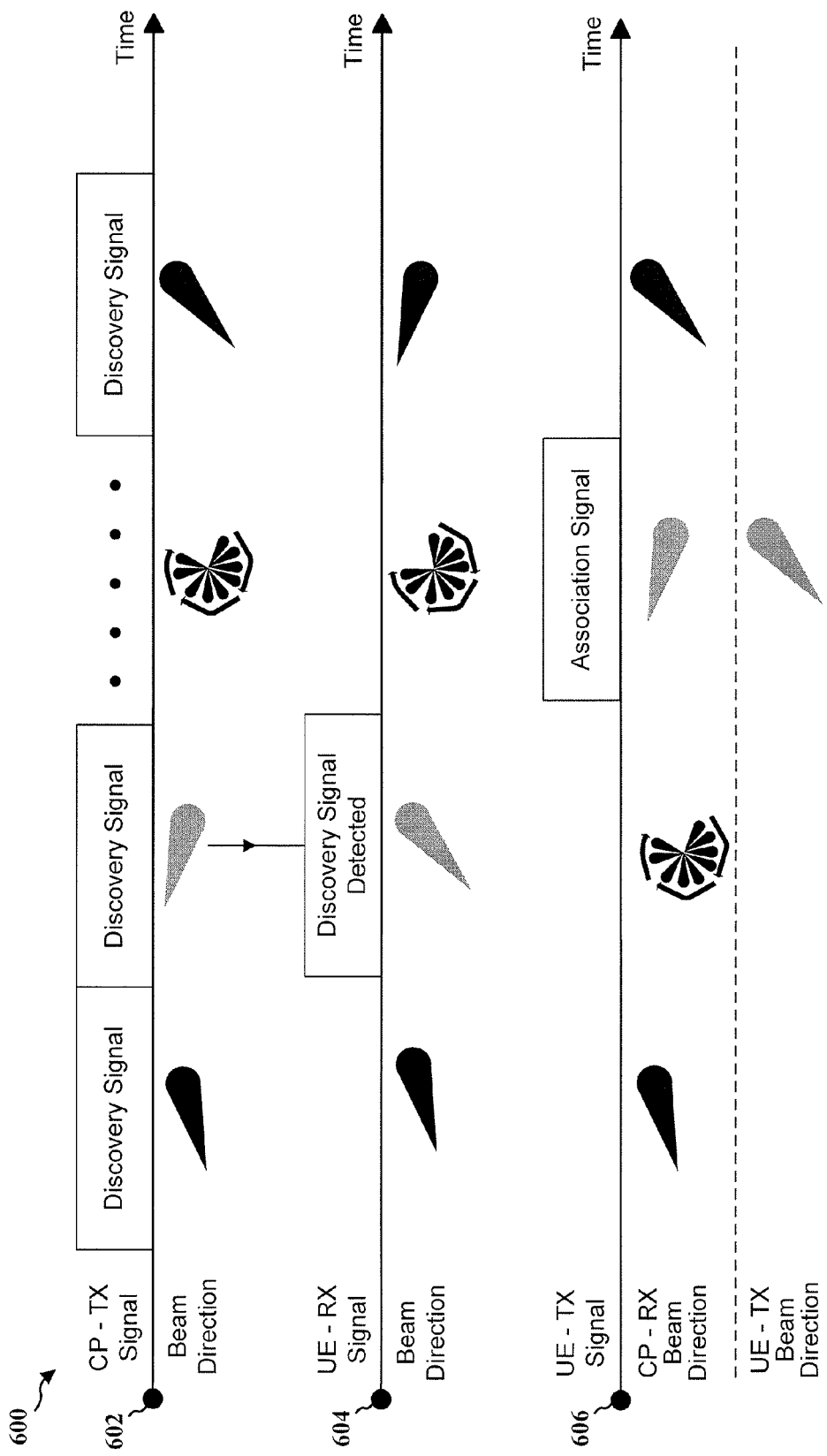
FIG. 6 is a diagram illustrating a discovery and association signaling protocol.

FIG. 6 is a diagram 600 illustrating a discovery and association signaling protocol. Referring to timeline 602 of FIG. 6, during a discovery phase CPs may respectively transmit unique discovery signals. Each CP may transmit discovery signals to cover an omni-directional coverage area by transmitting the discovery signals according to a directional beam transmit pattern sweep.

Referring to timeline 604 of FIG. 6, a UE may listen for discovery signals by performing a directional beam receive pattern sweep to increase array gain. The UE may make note of all unique discovery signals observed during the discovery phase and use the signals to determine or infer various information.

For example, the UE may determine which CPs are in a vicinity of the UE. The

UE may further determine a timing of a CP relative to the UE's clock. For example, the UE may determine a timing offset/alignment between the CP and the UE. The UE may also estimate a carrier offset between the CP and the UE.

In another example, the UE may determine an ideal or preferred beamforming direction (e.g., TX and RX beamforming vectors) for directional communication with each of the CPs discovered. An ideal UE beamforming direction may be inferred (determined) by observing a signal-to-noise ratio (SNR) on each of the beams received during the receive pattern sweep and comparing the observed SNRs to each other. The ideal UE beamforming direction may correspond to a direction at which a beam with the highest SNR was received. An ideal CP beamforming direction may be inferred (determined) by a location of a discovery signal in a slotted system where the CP follows a systematic sweeping pattern. For example, the ideal CP beamforming direction may correspond to a direction of the transmit pattern sweep at which the CP transmits the discovery signal.

Referring to timeline 606 of FIG. 6, during an association phase, the UE may wait for a designated association time (similar to a RACH opportunity in a cellular system) to transmit an association signal. The CP may adhere to a receive sweep pattern that corresponds (e.g., has a one-to-one mapping) with the transmit sweep pattern used to transmitting a discovery signal. In an aspect, the mapping between the CP's transmit sweep (for transmitting a discovery signal) and the CP's receive sweep (for receiving an association signal) is a function of a cell identification (ID) transmitted in the CP's unique discovery signal.

The UE may use knowledge of the ideal UE beamforming direction and the ideal

CP beamforming direction (determined during the discovery phase) to transmit the association signal during a time slot at which the CP's receive beam matches an ideal UE transmit beam. The UE may repeat the association process for all CPs for which a discovery signal was detected.

A CP that receives the UE's association signal may provide a resource grant to the UE enabling the UE to transmit and receive data with the CP. The resource grant may be sent in the same or different direction specified by the UE during the association phase. The UE may use the resource grant to send to the CP information pertaining to the UE's capabilities, for example.

At the end of the discovery and association process described above, the UE will have discovered all neighboring CPs and simultaneously acquired identification, timing, carrier frequency, and beamforming direction information of each CP. Also, the UE will have actively associated with all CPs that could potentially serve the UE. This is advantageous over an existing association operation in a wireless system where the UE associates with only one CP and passively monitors other CPs in case a need for handover arises. As opposed to passive monitoring, the present disclosure's active association with a larger "active CP set" can accelerate a handover procedure and help counteract the UE's susceptibility to signal blockage experienced at higher carrier frequencies.

In an aspect, the discovery and association phases may be tightly coordinated and follow a specific/predictable timeline. A slotted/scheduled design of the present disclosure avoids the overhead of control interaction in asynchronous designs (e.g., IEEE 802.11ad) wherein each transmission must be be preceded by a lengthy preamble, must contain all necessary information such as beam ID, and must occur after the transmitter wins contention for a channel. In the slotted design of the present disclosure, channel contention and preambles for timing synchronization are not required. Furthermore, pertinent information such as beam direction need not be explicitly exchanged, but rather inferred by the timing and sweeping configuration of the slotted system.

Figure 7:
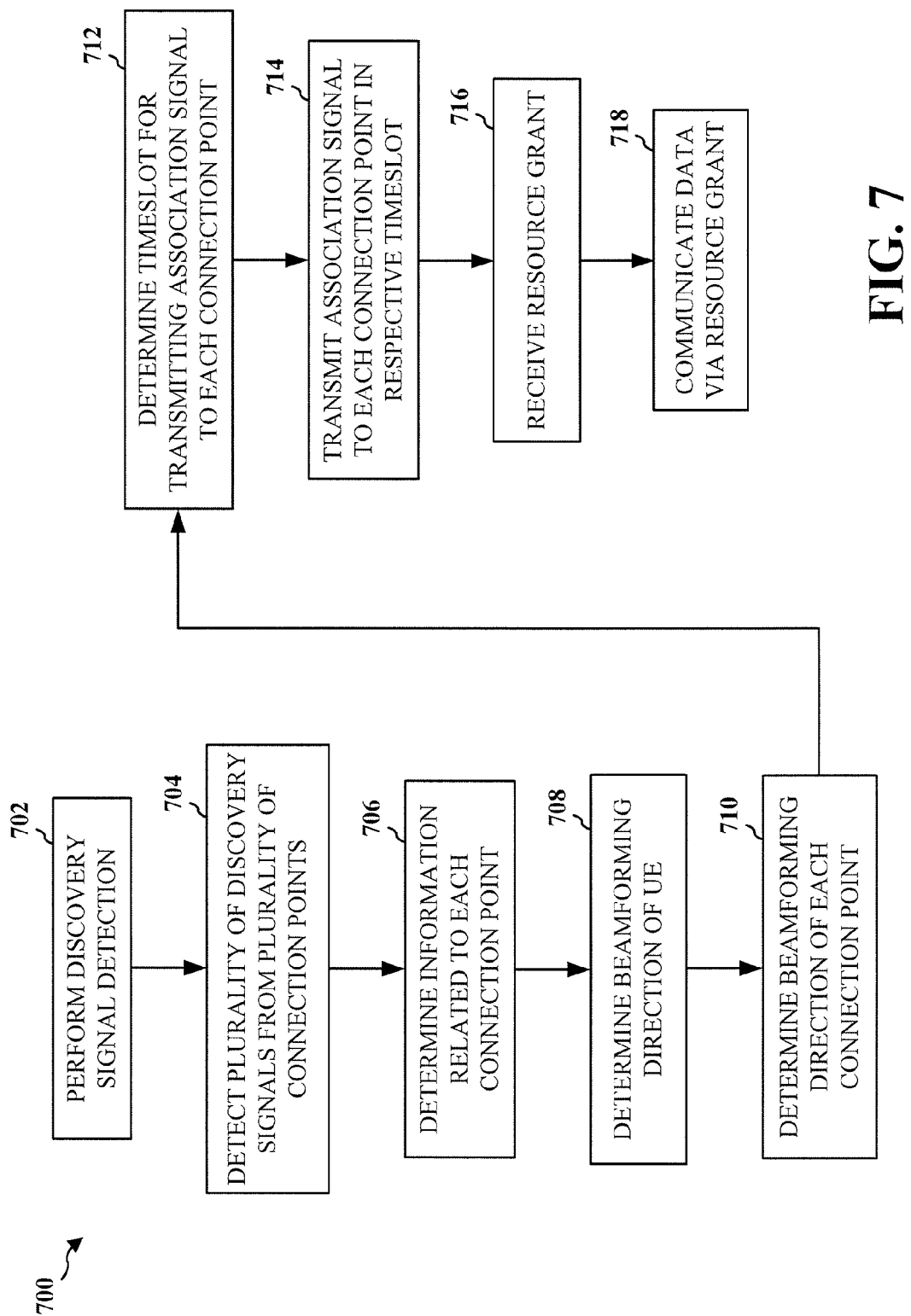
FIG. 7 is a flow chart of a method of wireless communication.

FIG. 7 is a flow chart 700 of a method of wireless communication. The method may be performed by a UE (e.g., UE 502). At step 702, the UE performs discovery signal detection by listening for at least one directional beam according to a first pattern. For example, referring to FIG. 5B, the UE may listen for beamformed discovery signals in different receive directions (e.g., directions E, F, G, and H) according to a sequence/pattern E-F-G-H, a sequence/pattern F-H-E-G, or any other sequence or pattern.

At step 704, the UE detects a plurality of discovery signals respectively from a plurality of CPs. Each CP transmits a discovery signal by transmitting a directional beam according to a respective pattern. For example, referring to FIG. 5A, each CP may transmit beamformed discovery signals in different transmit directions (e.g., directions A, B, C, and D) according to a sequence/pattern A-B-C-D, a sequence/pattern B-D-A-C, or any other sequence or pattern.

At step 706, the UE determines information related to each CP based on the discovery signal detected from a respective CP. The information may include a cell identifier (ID) of the respective CP and/or a mapping between a timeslot for transmitting an association signal to the respective CP and a timeslot in which the respective discovery signal is transmitted by the respective CP according to the respective pattern. The mapping may be a function of the cell ID. Moreover, timing information and a carrier frequency of the respective CP may be derivable from the information.

At step 708, the UE determines a beamforming direction of the UE based on a direction of the first pattern at which a discovery signal having a high signal quality is received. At step 710, the UE determines a beamforming direction of each CP based on a direction of the respective pattern at which a respective discovery signal is transmitted.

At step 710, the UE determines a timeslot for transmitting an association signal to each CP. A respective timeslot may be determined based on the information determined for the respective CP or a timeslot in which the respective discovery signal is transmitted by the respective CP according to the respective pattern.

At step 712, the UE transmits an association signal to each CP in the respective timeslot according to the beamforming direction of the UE and the beamforming direction of the respective CP. The association signal includes an intent to establish a communication link with the respective CP. In an aspect, the beamforming direction of the UE and the beamforming direction of the respective CP is derivable from a beamforming direction of the association signal or the timeslot in which the association signal is transmitted.

At step 716, the UE may receive a resource grant from at least one CP of the plurality of CPs based on the association signal transmitted from the UE. Thereafter, at step 718, the UE may communicate data with the at least one CP via the resource grant.

Figure 8:
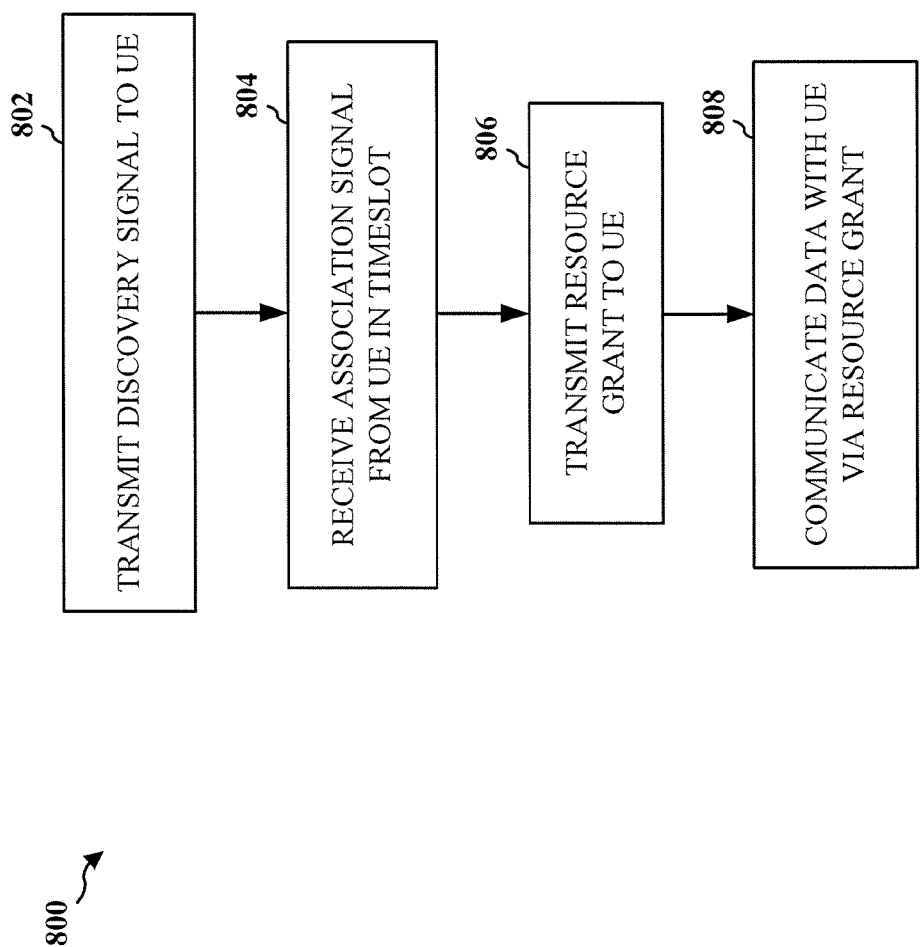
FIG. 8 is a flow chart of a method of wireless communication.

FIG. 8 is a flow chart 800 of a method of wireless communication. The method may be performed by a CP (e.g., CP 504). At step 802, the CP transmits a discovery signal to a UE by transmitting a directional beam according to a first pattern. For example, referring to FIG. 5A, the CP may transmit beamformed discovery signals in different transmit directions (e.g., directions A, B, C, and D) according to a sequence/pattern A-B-C-D, a sequence/pattern B-D-A-C, or any other sequence or pattern. In an aspect, the first pattern is a function of a cell identifier (ID) of the CP. In another aspect, the first pattern is communicated to the UE via the discovery signal. Furthermore, the UE may perform discovery signal detection by listening for at least one directional beam according to a second pattern. For example, referring to FIG. 5B, the UE may listen for beamformed discovery signals in different receive directions (e.g., directions E, F, G, and H) according to a sequence/pattern E-F-G-H, a sequence/pattern F-H-E-G, or any other sequence or pattern.

At step 804, the CP receives an association signal from the UE in a timeslot. The association signal includes an intent of the UE to establish a communication link with the CP. The association signal may be received according to a beamforming direction of the UE and a beamforming direction of the CP. The beamforming direction of the UE may be based on a direction of the second pattern at which the discovery signal is received at the UE with a high signal quality. The beamforming direction of the CP may be based on a direction of the first pattern at which the discovery signal is transmitted. Moreover, the timeslot for receiving the association signal may be determined based on information included in or inferred from the discovery signal and/or a timeslot in which the discovery signal is transmitted by the CP according to the first pattern. In an aspect, the beamforming direction of the UE and the beamforming direction of the CP may be derivable from a beamforming direction of the association signal or the timeslot in which the association signal is received.

The information included in the discovery signal may include a cell identifier (ID) of the CP and/or a mapping between the timeslot for receiving the association signal from the UE and the timeslot in which the discovery signal is transmitted by the CP according to the first pattern. The mapping may be a function of the cell ID. Moreover, timing information and a carrier frequency of the CP may be derivable from the information.

At step 806, the CP transmits a resource grant to the UE based on the association signal received from the UE. Thereafter, at step 808, the CP communicates data with the UE via the resource grant.

Figure 9:
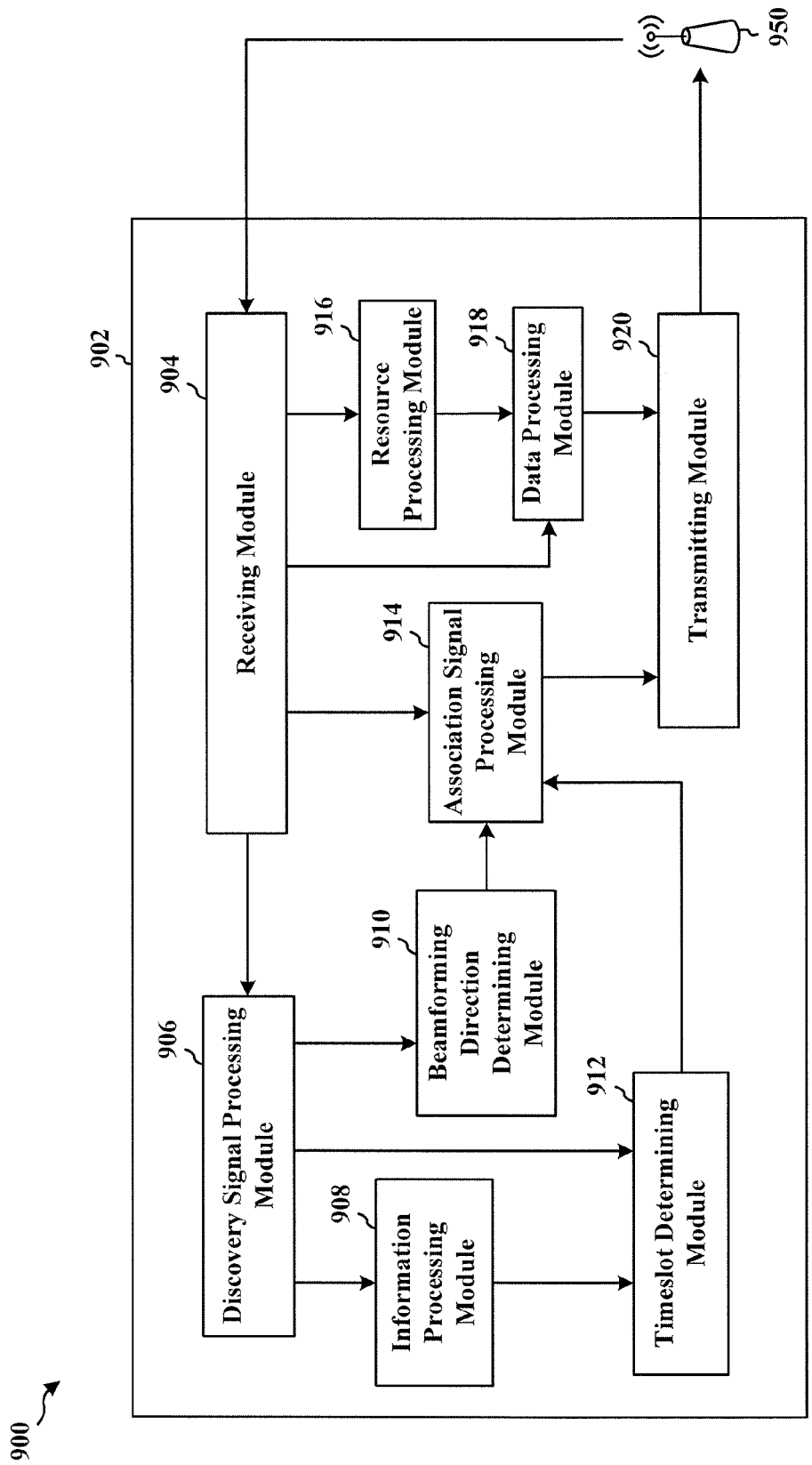
FIG. 9 is a data flow diagram illustrating the data flow between different modules/means/components in an exemplary apparatus.

FIG. 9 is a data flow diagram 900 illustrating the data flow between different modules/means/components in an exemplary apparatus 902. The apparatus may be a UE (e.g., UE 502). The apparatus includes a receiving module 904, a discovery signal processing module 906, an information processing module 908, a beamforming direction determining module 910, a timeslot determining module 912, an association signal processing module 914, a resource processing module 916, a data processing module 918, and a transmitting module 920.

The discovery signal processing module 906 performs discovery signal detection by listening (via the receiving module 904) for at least one directional beam according to a first pattern. For example, referring to FIG. 5B, the discovery signal processing module 906 may listen for beamformed discovery signals in different receive directions (e.g., directions E, F, G, and H) according to a sequence/pattern E-F-G-H, a sequence/pattern F-H-E-G, or any other sequence or pattern.

The discovery signal processing module 906 detects (via the receiving module 904) a plurality of discovery signals respectively from a plurality of CPs (e.g., a plurality of CPs 950). Each CP transmits a discovery signal by transmitting a directional beam according to a respective pattern. For example, referring to FIG. 5A, each CP may transmit beamformed discovery signals in different transmit directions (e.g., directions A, B, C, and D) according to a sequence/pattern A-B-C-D, a sequence/pattern B-D-A-C, or any other sequence or pattern.

The information processing module 908 determines information related to each CP based on the discovery signal detected from a respective CP. The information may include a cell identifier (ID) of the respective CP and/or a mapping between a timeslot for transmitting an association signal to the respective CP and a timeslot in which the respective discovery signal is transmitted by the respective CP according to the respective pattern. The mapping may be a function of the cell ID. Moreover, timing information and a carrier frequency of the respective CP may be derivable from the information.

The beamforming direction determining module 910 determines a beamforming direction of the apparatus 902 based on a direction of the first pattern at which a discovery signal having a high signal quality is received. The beamforming direction determining module 910 also determines a beamforming direction of each CP based on a direction of the respective pattern at which a respective discovery signal is transmitted.

The timeslot determining module 912 determines a timeslot for transmitting an association signal to each CP. A respective timeslot may be determined based on the information determined for the respective CP or a timeslot in which the respective discovery signal is transmitted by the respective CP according to the respective pattern.

The association signal processing module 914 transmits (via the transmitting module 920) an association signal to each CP in the respective timeslot according to the beamforming direction of the apparatus 902 and the beamforming direction of the respective CP. The association signal includes an intent to establish a communication link with the respective CP. In an aspect, the beamforming direction of the apparatus 902 and the beamforming direction of the respective CP is derivable from a beamforming direction of the association signal or the timeslot in which the association signal is transmitted.

The resource processing module 916 may receive a resource grant from at least one CP of the plurality of CPs based on the association signal transmitted from the association signal processing module 914. Thereafter, the data processing module 918 may communicate data (through the receiving module 904 and the transmitting module 920) with the at least one CP via the resource grant.

Figure 10:
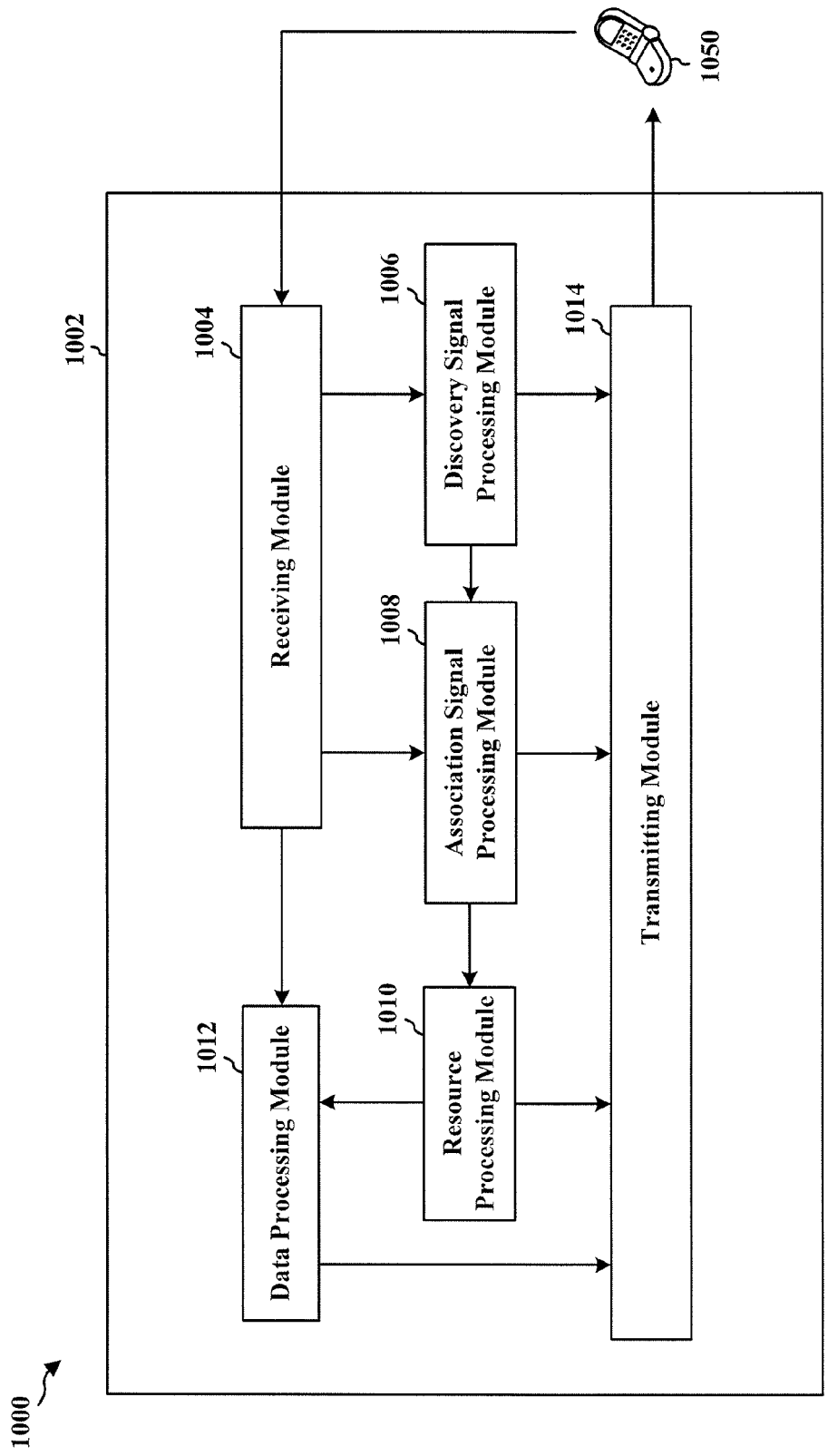
FIG. 10 is a data flow diagram illustrating the data flow between different modules/means/components in an exemplary apparatus.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 10 is a data flow diagram 1000 illustrating the data flow between different modules/means/components in an exemplary apparatus 1002. The apparatus may be a CP. The apparatus includes a receiving module 1004, a discovery signal processing module 1006, an association signal processing module 1008, a resource processing module 1010, a data processing module 1012, and a transmitting module 1014.

The discovery signal processing module 1006 transmits (via the transmitting module 1014) a discovery signal to a UE (e.g. UE 1050) by transmitting a directional beam according to a first pattern. For example, referring to FIG. 5A, the discovery signal processing module 1006 may transmit beamformed discovery signals in different transmit directions (e.g., directions A, B, C, and D) according to a sequence/pattern A-B-C-D, a sequence/pattern B-D-A-C, or any other sequence or pattern. In an aspect, the first pattern is a function of a cell identifier (ID) of the apparatus 1002. In another aspect, the first pattern is communicated to the UE via the discovery signal. Furthermore, the UE may perform discovery signal detection by listening for at least one directional beam according to a second pattern. For example, referring to FIG. 5B, the UE may listen for beamformed discovery signals in different receive directions (e.g., directions E, F, G, and H) according to a sequence/pattern E-F-G-H, a sequence/pattern F-H-E-G, or any other sequence or pattern.

The association signal processing module 1008 receives (via the receiving module 1004) an association signal from the UE in a timeslot. The association signal includes an intent of the UE to establish a communication link with the apparatus 1002. The association signal may be received according to a beamforming direction of the UE and a beamforming direction of the apparatus 1002. The beamforming direction of the UE may be based on a direction of the second pattern at which the discovery signal is received at the UE with a high signal quality. The beamforming direction of the apparatus 1002 may be based on a direction of the first pattern at which the discovery signal is transmitted. Moreover, the timeslot for receiving the association signal may be determined based on information included in or inferred from the discovery signal and/or a timeslot in which the discovery signal is transmitted by the CP according to the first pattern. In an aspect, the beamforming direction of the UE and the beamforming direction of the apparatus 1002 may be derivable from a beamforming direction of the association signal or the timeslot in which the association signal is received.

The information included in the discovery signal may include a cell identifier (ID) of the apparatus 1002 and/or a mapping between the timeslot for receiving the association signal from the UE and the timeslot in which the discovery signal is transmitted by the apparatus 1002 according to the first pattern. The mapping may be a function of the cell ID. Moreover, timing information and a carrier frequency of the apparatus 1002 may be derivable from the information.

The resource processing module 1010 transmits (via the transmitting module 1014) a resource grant to the UE based on the association signal received from the UE. Thereafter, the data processing module 1012 communicates (through the receiving module 1004 and the transmitting module 1014) data with the UE via the resource grant.

Figure 11:
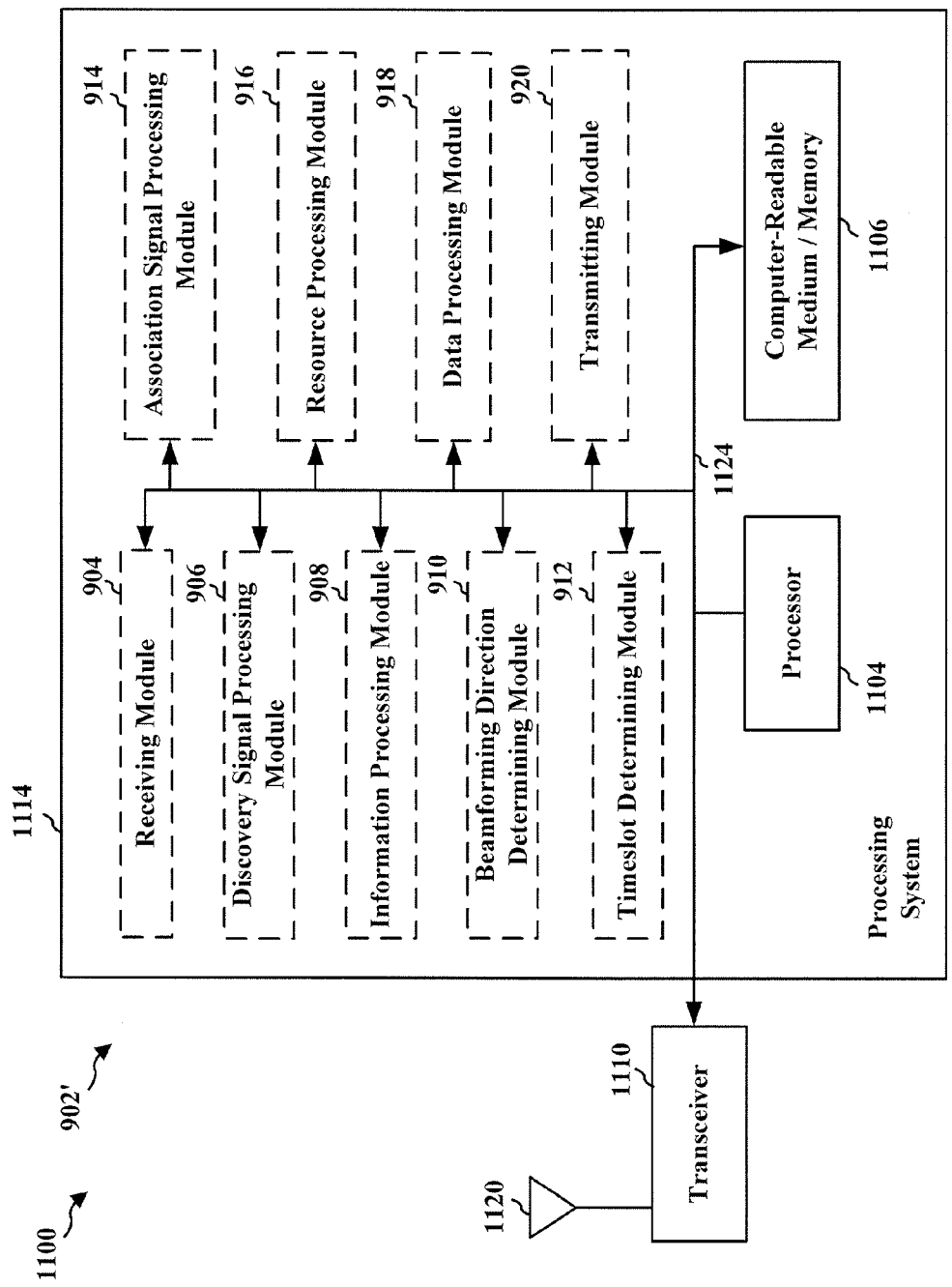
FIG. 11 is a diagram illustrating an example of a hardware implementation for an apparatus employing a processing system.

The apparatus may include additional modules that perform each of the steps of the algorithm in the aforementioned flow chart of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 11 is a diagram 1100 illustrating an example of a hardware implementation for an apparatus 902' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 904, 906, 908, 910, 912, 914, 916, 918, 920, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 904. In addition, the transceiver 1110 receives information from the processing system 1114, specifically the transmitting module 920, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 904, 906, 908, 910, 912, 914, 916, 918, and 920. The modules may be software modules running in the processor 1104, resident/stored in the computer readable medium/memory 1106, one or more hardware modules coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 902/902' for wireless communication includes means for performing discovery signal detection by listening for at least one directional beam according to a first pattern; means for detecting a plurality of discovery signals respectively from a plurality of connection points (CPs), wherein each CP transmits a discovery signal by transmitting a directional beam according to a respective pattern; means for determining information related to each CP based on the discovery signal detected from a respective CP; means for determining a beamforming direction of the UE based on a direction of the first pattern at which a discovery signal having a high signal quality is received; means for determining a beamforming direction of each CP based on a direction of the respective pattern at which a respective discovery signal is transmitted; means for determining a timeslot for transmitting an association signal to each CP, wherein a respective timeslot is determined based on the information determined for the respective CP or a timeslot in which the respective discovery signal is transmitted by the respective CP according to the respective pattern; means for transmitting an association signal to each CP in the respective timeslot according to the beamforming direction of the UE and the beamforming direction of the respective CP; means for receiving a resource grant from at least one CP of the plurality of CPs; and means for communicating data with the at least one CP via the resource grant.

The aforementioned means may be one or more of the aforementioned modules of the apparatus 902 and/or the processing system 1114 of the apparatus 902' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
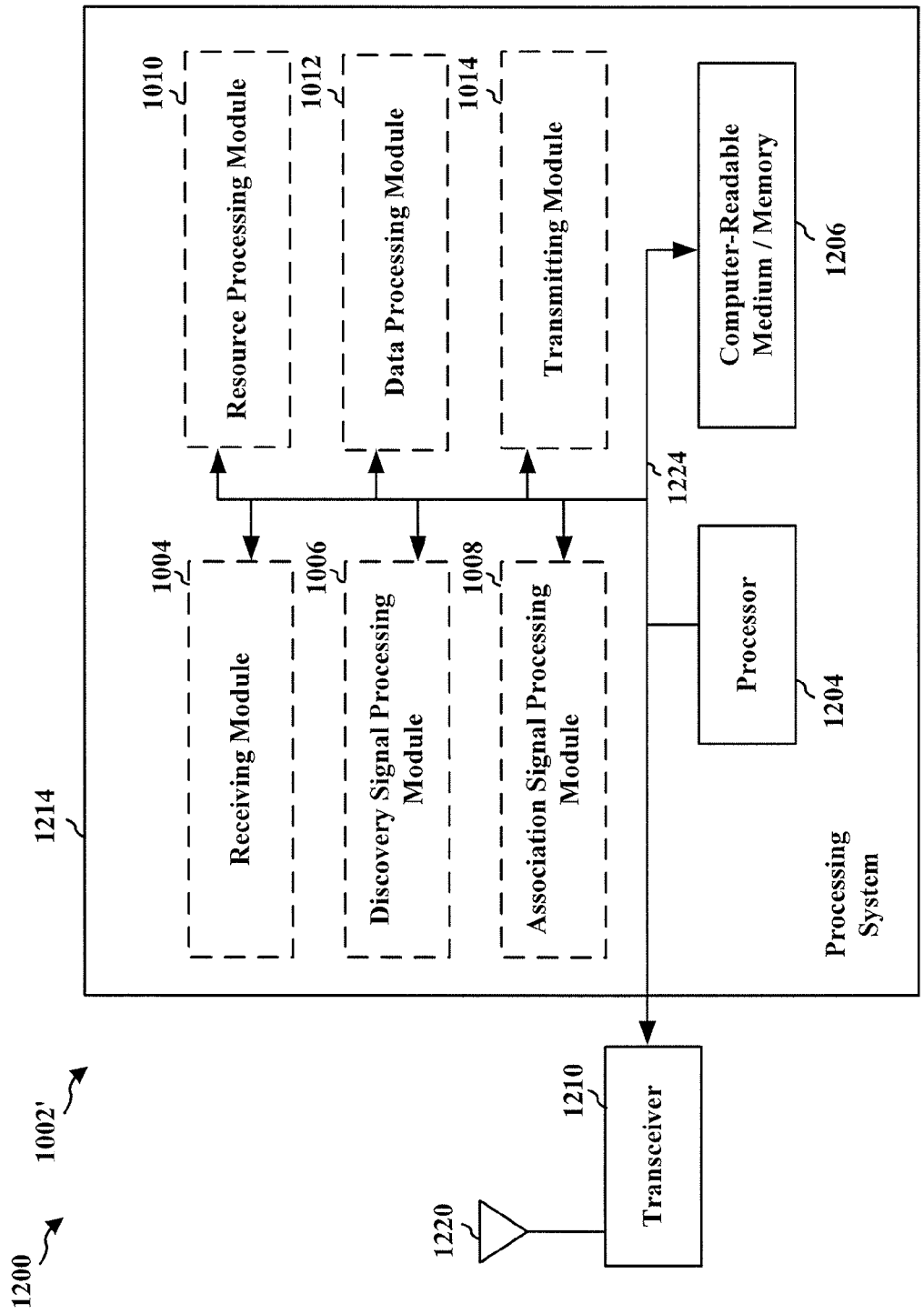
FIG. 12 is a diagram illustrating an example of a hardware implementation for an apparatus employing a processing system.

FIG. 12 is a diagram 1200 illustrating an example of a hardware implementation for an apparatus 1002' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1004, 1006, 1008, 1010, 1012, 1014, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1004. In addition, the transceiver 1210 receives information from the processing system 1214, specifically the transmitting module 1014, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1004, 1006, 1008, 1010, 1012, and 1014. The modules may be software modules running in the processor 1204, resident/stored in the computer readable medium/memory 1206, one or more hardware modules coupled to the processor 1204, or some combination thereof. The processing system 1214 may be a component of the CP 310 and may include the memory 376 and/or at least one of the TX processor 316, the RX processor 370, and the controller/processor 375.

In one configuration, the apparatus 1002/1002' for wireless communication includes means for transmitting a discovery signal to a user equipment (UE) by transmitting a directional beam according to a first pattern; means for receiving an association signal from the UE in a timeslot, wherein the association signal is received according to a beamforming direction of the UE and a beamforming direction of the CP, wherein the beamforming direction of the UE is based on a direction of a second pattern at which the discovery signal is received at the UE with a high signal quality, wherein the beamforming direction of the CP is based on a direction of the first pattern at which the discovery signal is transmitted, and wherein the timeslot for receiving the association signal is determined based on: information included in or inferred from the discovery signal, or a timeslot in which the discovery signal is transmitted by the CP according to the first pattern; means for transmitting a resource grant to the UE; and means for communicating data with the UE via the resource grant.

The aforementioned means may be one or more of the aforementioned modules of the apparatus 1002 and/or the processing system 1214 of the apparatus 1002' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
    performing discovery signal detection by listening for at least one directional beam according to a first pattern;
    detecting a plurality of discovery signals respectively from a plurality of connection points (CPs), wherein each CP transmits a discovery signal by transmitting a directional beam according to a respective pattern;
    determining information related to each CP based on the discovery signal detected from a respective CP;
    determining a beamforming direction of the UE based on a direction of the first pattern at which a discovery signal having a high signal quality is received;
    determining a beamforming direction of each CP based on a direction of the respective pattern at which a respective discovery signal is transmitted;
    determining a timeslot for transmitting an association signal to each CP, wherein a respective timeslot is determined based on the information determined for the respective CP or based on a timeslot in which the respective discovery signal is transmitted by the respective CP according to the respective pattern, wherein the information comprises at least one of:
        a cell identifier (ID) of the respective CP; or
        a mapping between the timeslot for transmitting the association signal to the respective CP and the timeslot in which the respective discovery signal is transmitted by the respective CP according to the respective pattern, and wherein the mapping is a function of the cell ID; and
    transmitting the association signal to each CP in the respective timeslot according to the beamforming direction of the UE and the beamforming direction of the respective CP.

2. The method of claim 1, wherein the association signal comprises an intent to establish a communication link with the respective CP.

3. The method of claim 1, wherein the beamforming direction of the UE and the beamforming direction of the respective CP is derivable from a beamforming direction of the association signal or the timeslot in which the association signal is transmitted.

4. The method of claim 1, further comprising:
    receiving a resource grant from at least one CP of the plurality of CPs; and
    communicating data with the at least one CP via the resource grant.

5. The method of claim 1, wherein timing information and a carrier frequency of the respective CP is derivable from the information.

6. A method of wireless communication at a connection point (CP), comprising:
    transmitting a discovery signal to a user equipment (UE) by transmitting a directional beam according to a first pattern; and
    receiving an association signal from the UE in a timeslot, wherein the association signal is received according to a beamforming direction of the UE and a beamforming direction of the CP,
    wherein the beamforming direction of the UE is based on a direction of a second pattern at which the discovery signal is received at the UE with a high signal quality,
    wherein the beamforming direction of the CP is based on a direction of the first pattern at which the discovery signal is transmitted,
    wherein the timeslot for receiving the association signal is determined based on:
        information included in or inferred from the discovery signal, or
        a timeslot in which the discovery signal is transmitted by the CP according to the first pattern,
    wherein the information comprises at least one of:
        a cell identifier (ID) of the CP; or
        a mapping between the timeslot for receiving the association signal from the UE and the timeslot in which the discovery signal is transmitted by the CP according to the first pattern, and wherein the mapping is a function of the cell ID.

7. The method of claim 6, wherein:
    the first pattern is a function of a cell identifier (ID) of the CP; or
    the first pattern is communicated to the UE via the discovery signal.

8. The method of claim 6, wherein the association signal comprises an intent of the UE to establish a communication link with the CP.

9. The method of claim 6, wherein the beamforming direction of the UE and the beamforming direction of the CP is derivable from a beamforming direction of the association signal or the timeslot in which the association signal is received.

10. The method of claim 6, further comprising:
    transmitting a resource grant to the UE; and
    communicating data with the UE via the resource grant.

11. The method of claim 6, wherein timing information and a carrier frequency of the CP is derivable from the information.

12. A user equipment (UE), comprising:
means for performing discovery signal detection by listening for at least one directional beam according to a first pattern;
means for detecting a plurality of discovery signals respectively from a plurality of connection points (CPs), wherein each CP transmits a discovery signal by transmitting a directional beam according to a respective pattern;
means for determining information related to each CP based on the discovery signal detected from a respective CP;
means for determining a beamforming direction of the UE based on a direction of the first pattern at which a discovery signal having a high signal quality is received;
means for determining a beamforming direction of each CP based on a direction of the respective pattern at which a respective discovery signal is transmitted;
means for determining a timeslot for transmitting an association signal to each CP, wherein a respective timeslot is determined based on the information determined for the respective CP or based on a timeslot in which the respective discovery signal is transmitted by the respective CP according to the respective pattern,
wherein the information comprises at least one of:
  a cell identifier (ID) of the respective CP; or
  a mapping between the timeslot for transmitting the association signal to the respective CP and the timeslot in which the respective discovery signal is transmitted by the respective CP according to the respective pattern, and wherein the mapping is a function of the cell ID; and
means for transmitting the association signal to each CP in the respective timeslot according to the beamforming direction of the UE and the beamforming direction of the respective CP.

13. The UE of claim 12, wherein the association signal comprises an intent to establish a communication link with the respective CP.

14. The UE of claim 12, wherein the beamforming direction of the UE and the beamforming direction of the respective CP is derivable from a beamforming direction of the association signal or the timeslot in which the association signal is transmitted.

15. The UE of claim 12, further comprising:
means for receiving a resource grant from at least one CP of the plurality of CPs; and
means for communicating data with the at least one CP via the resource grant.

16. The UE of claim 12, wherein timing information and a carrier frequency of the respective CP is derivable from the information.

17. A connection point (CP), comprising:
means for transmitting a discovery signal to a user equipment (UE) by transmitting a directional beam according to a first pattern; and
means for receiving an association signal from the UE in a timeslot, wherein the association signal is received according to a beamforming direction of the UE and a beamforming direction of the CP,
wherein the beamforming direction of the UE is based on a direction of a second pattern at which the discovery signal is received at the UE with a high signal quality,
wherein the beamforming direction of the CP is based on a direction of the first pattern at which the discovery signal is transmitted,
wherein the timeslot for receiving the association signal is determined based on:
  information included in or inferred from the discovery signal, or
  a timeslot in which the discovery signal is transmitted by the CP according to the first pattern,
wherein the information comprises at least one of:
  a cell identifier (ID) of the CP; or
  a mapping between the timeslot for receiving the association signal from the UE and the timeslot in which the discovery signal is transmitted by the CP according to the first pattern, wherein the mapping is a function of the cell ID.

18. The CP of claim 17, wherein:
the first pattern is a function of a cell identifier (ID) of the CP; or
the first pattern is communicated to the UE via the discovery signal.

19. The CP of claim 17, wherein the association signal comprises an intent of the UE to establish a communication link with the CP.

20. The CP of claim 17, wherein the beamforming direction of the UE and the beamforming direction of the CP is derivable from a beamforming direction of the association signal or the timeslot in which the association signal is received.

21. The CP of claim 17, further comprising:
means for transmitting a resource grant to the UE; and
means for communicating data with the UE via the resource grant.

22. The CP of claim 17, wherein timing information and a carrier frequency of the CP is derivable from the information.

23. An apparatus for wireless communication, comprising:
a memory;
at least one processor coupled to the memory and configured to:
  perform discovery signal detection by listening for at least one directional beam according to a first pattern;
  detect a plurality of discovery signals respectively from a plurality of connection points (CPs), wherein each CP transmits a discovery signal by transmitting a directional beam according to a respective pattern;
  determine information related to each CP based on the discovery signal detected from a respective CP;
  determine a beamforming direction of the UE based on a direction of the first pattern at which a discovery signal having a high signal quality is received;
  determine a beamforming direction of each CP based on a direction of the respective pattern at which a respective discovery signal is transmitted;
  determine a timeslot for transmitting an association signal to each CP, wherein a respective timeslot is determined based on the information determined for the respective CP or based on a timeslot in which the respective discovery signal is transmitted by the respective CP according to the respective pattern,
  wherein the information comprises at least one of:
    a cell identifier (ID) of the respective CP; or
    a mapping between the timeslot for transmitting the association signal to the respective CP and the timeslot in which the respective discovery signal is transmitted by the respective CP according to the respective pattern, and wherein the mapping is a function of the cell ID; and transmit the association signal to each CP in the respective timeslot according to the beamforming direction of the UE and the beamforming direction of the respective CP.

24. An apparatus for wireless communication, comprising:
a memory;
at least one processor coupled to the memory and configured to:
transmit a discovery signal to a user equipment (UE) by transmitting a directional beam according to a first pattern; and
receive an association signal from the UE in a timeslot, wherein the association signal is received according to a beamforming direction of the UE and a beamforming direction of the CP,
wherein the beamforming direction of the UE is based on a direction of a second pattern at which the discovery signal is received at the UE with a high signal quality,
wherein the beamforming direction of the CP is based on a direction of the first pattern at which the discovery signal is transmitted,
wherein the timeslot for receiving the association signal is determined based on:
information included in or inferred from the discovery signal, or
a timeslot in which the discovery signal is transmitted by the CP according to the first pattern,
wherein the information comprises at least one of:
a cell identifier (ID) of the CP; or
a mapping between the timeslot for receiving the association signal from the UE and the timeslot in which the discovery signal is transmitted by the CP according to the first pattern, and wherein the mapping is a function of the cell ID.

25. A non-transitory computer-readable medium storing computer executable code, comprising code for:
performing discovery signal detection by listening for at least one directional beam according to a first pattern;
detecting a plurality of discovery signals respectively from a plurality of connection points (CPs), wherein each CP transmits a discovery signal by transmitting a directional beam according to a respective pattern;
determining information related to each CP based on the discovery signal detected from a respective CP;
determining a beamforming direction of the UE based on a direction of the first pattern at which a discovery signal having a high signal quality is received;
determining a beamforming direction of each CP based on a direction of the respective pattern at which a respective discovery signal is transmitted;
determining a timeslot for transmitting an association signal to each CP, wherein a respective timeslot is determined based on the information determined for the respective CP or based on a timeslot in which the respective discovery signal is transmitted by the respective CP according to the respective pattern, wherein the information comprises at least one of:
a cell identifier (ID) of the respective CP; or
a mapping between the timeslot for transmitting the association signal to the respective CP and the timeslot in which the respective discovery signal is transmitted by the respective CP according to the respective pattern, and wherein the mapping is a function of the cell ID; and
transmitting the association signal to each CP in the respective timeslot according to the beamforming direction of the UE and the beamforming direction of the respective CP.

26. A non-transitory computer-readable medium storing computer executable code, comprising code for:
transmitting a discovery signal to a user equipment (UE) by transmitting a directional beam according to a first pattern; and
receiving an association signal from the UE in a timeslot, wherein the association signal is received according to a beamforming direction of the UE and a beamforming direction of the CP,
wherein the beamforming direction of the UE is based on a direction of a second pattern at which the discovery signal is received at the UE with a high signal quality,
wherein the beamforming direction of the CP is based on a direction of the first pattern at which the discovery signal is transmitted,
wherein the timeslot for receiving the association signal is determined based on:
information included in or inferred from the discovery signal, or
a timeslot in which the discovery signal is transmitted by the CP according to the first pattern, wherein the information comprises at least one of:
a cell identifier (ID) of the CP; or
a mapping between the timeslot for receiving the association signal from the UE and the timeslot in which the discovery signal is transmitted by the CP according to the first pattern, and wherein the mapping is a function of the cell ID.

* * * * *